Dec. 30, 1947.  O. M. ARNOLD  2,433,727
PLASTIC COMPOSITIONS AND METHOD OF MAKING
Filed Oct. 29, 1941
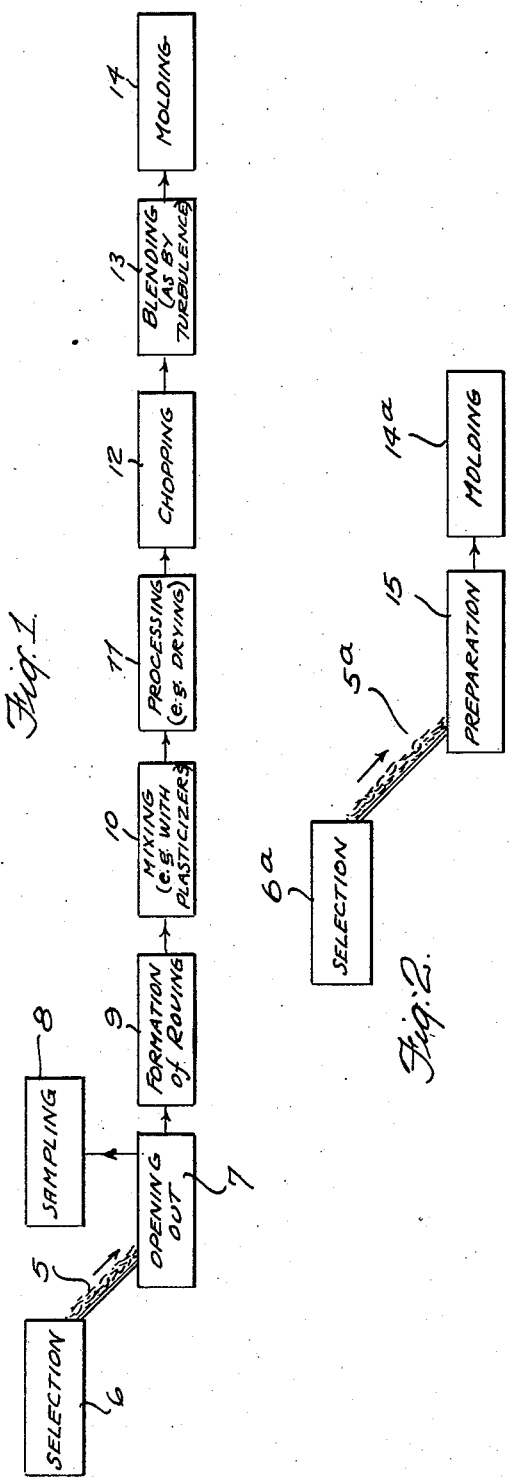
INVENTOR.
ORLAN M. ARNOLD
BY
ATTORNEY Patented Dec. 30, 1947

2,433,727

UNITED STATES PATENT OFFICE 2,433,727

PLASTIC COMPOSITION AND METHOD OF MAKING

Orlan M. Arnold, Troy, N. Y.

Application October 29, 1941, Serial No. 416,989

9 Claims. (Cl. 18—48)

This invention relates to the treatment of thermoplastic substances and the preparation of molding compositions and to the molding of the same, and to utilization of fibrous textile scrap in various forms for production of valuable products. The term "textile fiber" and similar expressions as used herein are to be understood as defining the filaments of which textile materials are composed. In textile fibers, as is now well recognized, the molecules are oriented. This molecular orientation—which is imparted to rayon, nylon and other artificial fibers by the stretching and other controlled operations in their production, and which nature imparts to cotton, linen, silk, wool and other natural fibers—gives these fibers greater strength and toughness. The word "textile" as used herein is to be understood, unless otherwise limited, as being employed in its broad sense to include not only the weaving art but also the knitting, felting, and allied arts.

Prior to my invention various types of plastic substances have been used both for the manufacture of artificial fibers (generally referred to as rayon) and for the manufacture of molded plastic products. Such substances include particularly cellulose acetate, which is used for the production of celanese yarns and fabrics as well as for numerous molded and sheet plastics, vinyl chloride and acetate and related polymers, which are used in the manufacture of yarns and fabrics known as Vinyon as well as in the manufacture of various molded and sheet plastics, cellulose nitrate, which has been used in the production of rayon and fabrics as well as information of molded products and sheets commonly known as Celluloid; nylon, a newer polyamide type of synthetic fiber, is thermoplastic and therefore useful for molded products, particularly as the present invention makes it available for molding from textile scrap. Although the chemical substance which forms the basis for each of these several types of materials may be the same, whether it goes into fiber, sheet or molded products, the treatment and the compounding ingredients required for the different uses are different, so that actually the compositions have not been considered interchangeable.

Scrap resulting from molding operations with plastics of this type or from machining of such molded products has been reused in molding operations, and textile scrap has commonly been reused by releasing or combing out the fiber and respinning. It has also been suggested to reuse pure acetate rayon scrap by redissolving and reforming into filaments as in the original production of the acetate rayon. Because it is thus reusable, pure acetate rayon scrap commands a relatively high price in the market, but when, as is common, the acetate rayon has been combined with other fibers, either in the spinning or weaving operation or by mixing of different types of scrap in pieces too small to be worth separating, the material is considered much less valuable for reuse and large quantities of such scrap are available at reasonable cost.

On the other hand, in the plastic industry it is often desirable to add to a molding composition a fiber to serve as a reinforcing agent and filler; and it is a problem of recognized difficulty to so intimately distribute the fiber with the plastic substance that the fibers will extend uniformly into all parts of the product and will be thoroughly anchored and interlocked throughout their surfaces.

It is an object of the present invention to provide a solution to these problems and this is accomplished according to the present invention by the use of plastic substances in fibrous form for, or in the preparation of, molding compositions.

It is also an object of the present invention to provide for the economical and advantageous use in the molding industry of fibrous scrap from the textile industry.

Another object of the invention is to provide molded products of improved physical characteristics and an improved method for making such products.

Another object of the invention is to provide molded products of novel and desirable surface appearance and a method for producing the same.

Another object of the invention is to provide an improved method for the treatment of mixed fibers for the preparation of useful products.

Another object of the invention is to provide fibrous reinforcing agents in plastic compositions of uniform length, random orientation and uniform distribution through the mass.

Another object of the invention is to produce an improved molding composition and an improved method of making the same.

Another object of the invention is to provide an improved laminated product and an improved method of making the same.

Other objects and advantages of the invention will be evident to those skilled in the art from the following specification and claims.

With these several objects in view, the invention contemplates the utilization of plastic substances in fibrous form. For economic reasons it will ordinarily be desirable to use for this purpose fibrous textile scrap such, for example, as the unspun fibers which are scrapped in various operations in the manufacture of rayon, scrap yarn, roving, etc., from the spinning plants, scrap cloth and used cloth, felt, etc., which comes back through the rag collecting channels; but it will be understood that the invention is not limited to the use of such scrap materials, and, if scrap were not available, there would still be advantage in forming a plastic into fibers, in accordance with this invention, for purposes of molding. It will be understood, therefore, that although this application will refer generally to scrap as the material being operated upon, this is not by way of limitation but rather by way of example, giving the use in which the invention has its greatest value at present.

The invention may be applied with pure plastic substances in fibrous form or with mixtures of different plastic fibers or with mixtures of plastic and non-plastic fibers. The essential ingredient in each case is the plastic material in fibrous form. In the practice of the present invention such fibers, preferably after adding onto or around their exterior surfaces any other ingredient or ingredients of a desired molding composition, including particularly plasticizers, are then pressed together under heat and pressure, or such other conditions as favor the plastic flow and welding together of the fibers.

Assuming a case in which only plastic fibers are present, it is an advantage of my invention that, by thus applying a plasticizer to the exterior surface of the fiber, a welding and consolidating of the fibers can be secured while retaining the cores of the fibers intact and thus essentially obtaining the advantages of a plastic reinforced with fiber, notwithstanding that the molded substance is integral and substantially homogeneous throughout. The greatest advantage of my invention, however, will be apparent in the case where mixtures of fibers are used including both plastic fibers and substantially non-plastic fibers such as cotton, viscose or other regenerated cellulose, etc. In such case the fibers are easily mixed, with a substantially perfect blending and dispersion throughout the mass, either by their original blending in the thread or other fabric or, if such blending has not been sufficient, by cutting the fibers to short lengths and intermixing them in a turbulent suspension in a gas or liquid, or under other conditions which avoid lumping or snarling of the fibers.

Other ingredients may be added to the fibrous mass, in liquid form by spraying or flowing onto the fiber or fabric, or by dipping the fiber or fibrous fabric therein, and in the case of solid materials either by dissolving and adding as liquid ingredients or by comminuting and intermingling with the fiber in turbulent suspension or by applying to the surface of the fibrous mass or fabric and working it into the interstices.

A molding composition made according to my invention may be a loose fibrous mass or a felt or other fabric or it may be granular or powdered, according to the requirements of the molding operation. The molding itself may be effected by rolling, flat pressing, extruding, compression molding or injection molding, all of which methods are well known and commonly practiced for the molding of similar plastic substances.

It is an advantage of my invention that it permits of the making of products with controlled porosity since the fibrous nature of the mass gives it an elasticity which allows compression to any desired degree, while the fusion of interlaced fibers will give strength to the product even though interstices may remain.

In a typical process the fibrous scrap consisting of unspun fibers, sliver, roving, yarn, threads, cloth, wadding or felt, etc., or any mixture of them may be used, which I shall refer to broadly herein as "fabric." Advantageously, this scrap is opened out to release the fibers, e. g., by any of the methods now commonly used in preparing such fibrous scrap for respinning, and the fibers thus released are formed into a roving or felt, e. g., by apparatus and methods usual in textile industries. The composition of the mass is preferably controlled at this point first by a suitable selection and/or mixing of the available scrap materials, and secondly, by sampling the fibers as they are opened out, determining the proportions of different fibers therein and blending different batches to correct for variations from a desired composition. Thus, in a composition composed essentially of acetate and viscose rayon if the fiber as it is released at one time begins to run high in viscose it may be diverted and held back until the sampling shows the fiber running low in viscose at which time regulated proportion of the high viscose content material will be added to correct its composition; or, if desired, this correction can be made at a subsequent stage in the process, particularly in the blending operation.

The roving or felt formed in this way may be used directly as a molding material, particularly for the production of sheet stock or laminated products made by a compression molding technique. In such case, unless the fiber itself is of a composition adapted for molding directly, as would ordinarily be the case if the fiber is made especially for conversion into a molding composition, or unless the desired ingredients have previously been added to the scrap or to the fibrous mass before or during formation of the roving, such additional ingredients as, for example, plasticizers, fillers, pigments, and, if desired, other plastic materials may be added at this stage, e. g., by dissolving or dispersing in a liquid bath with which the roving or felt is saturated by dipping, flowing or spraying. After drying and/or cooling with agitation to solidify the liquid, the fibers in the roving or felt will be exteriorly coated and surrounded by the added ingredients and, upon pressing the mass at an elevated temperature, the ingredients will become incorporated in the plastic of the fiber at the same time that the fibers themselves are fused and welded together.

In most cases it is preferable, rather than molding the roving or felt directly as described above, to subject it to a further blending operation in which case the roving or felt, either with or without the addition of other ingredients as described, may be chopped into short lengths substantially corresponding to the desired fiber lengths, e. g., 1 mm. to 15 mm., and the resulting material then picked up by an air blast and carried into a blending chamber where the fiber is held in suspension for a considerable time by a constant agitation or turbulence in the air, which results in an intimate and thorough blending of the different types of fibers and other ingredients which may be added to this chamber either as finely divided solids or as sprayed liquid.

The blended product which gradually settles out and is collected from this blending chamber may be used directly as a molding powder in compression, injection, or extrusion molding or may be rolled or pressed into sheets or it may be subjected to any desired further treatment.

An example of one such process is illustrated in Fig. 1 wherein the fibrous textile scrap 5, having been selected at 6 so as to have a suitable proportion of suitable thermoplastic material, is opened out at 7. The opened-out fibers (which may be sampled at 8 as a check on the selection) are formed into the roving at 9. The roving is mixed with supplemental ingredients, as by having a coating of a plasticizing agent applied to the fibers at 10; and may be further processed at 11, as by drying to remove a solvent, if used with the plasticizing agent. The scrap may then be chopped at 12, blended in a turbulent mixer at 13 and molded at 14.

It is an important quality of this material that the short fibers are in wholly random orientation as well as being perfectly blended and intermingled with the various other fibers and other ingredients of the mold composition.

As a further alternative, the formation of the roving or felt may be dispensed with, the threads or fibers in other forms being chopped into such short lengths that the fibers readily separate and intermingle during the blending operation.

In certain of its broader aspects, the invention may be considered as involving the step (1) preparation of the scrap material, as by opening out, chopping, tearing, or otherwise reducing it to smaller particle form, or by dissolving; and (2) molding. As illustrated in Fig. 2, the scrap 5a is prepared at 7a and molded at 14a.

For some purposes, the scrap may be cut into larger pieces, or even used directly in the form of cloth, felt, thread, etc., these being treated, for example, with plasticizers and/or other ingredients in the same manner as already described above for the treatment of the roving. These may be subsequently fused in an injection molding machine or compressed or laminated on a roll or platen press. For example, as illustrated in Fig. 3, the mass of selected scrap 5b may be carried by a conveyor 16 under a spray 10b and through a dryer 11b and thence through molding rolls 17 and 18.

The following specific examples will illustrate the practical utilization of the invention:

*Example 1.*—Cloth or other textile scrap may be of any available composition having in excess of 10% cellulose acetate fiber and the balance insoluble fiber, e. g., viscose rayon. This material should be first carefully laundered and/or subjected to any other necessary treatment, such as dry cleaning, bleaching, etc., to remove any objectionable impurities.

The resulting cleaned fabric is then conditioned to a moisture content of about 2-4%. It is then inspected and its content of various fibrous materials estimated, and corrected if necessary by addition of other selected scrap higher in a desired constituent until the various fibers are in the proportion desired for the particular material which is to be made, e. g., acetate rayon 50% and viscose rayon 40%, cotton fiber 10%. The scrap is then put through a cutter which cuts the cloth into pieces of about 60 mm. average diameter; and the cut material may then be put through a shredder and/or subjected to any mechanical treatment, e. g., as in standard carding machinery to open out the threads in any bits of fabric remaining and to release the fibers therefrom. The fibers are then picked up in an air stream and carried through blowers into a turbulent chamber where the fibers are thoroughly intermixed and any orientation destroyed. The plasticizers, pigments, dyes and/or any other desired ingredients of the composition being prepared are added to the material in this chamber by blowing in as a spray or powder which becomes fully intermingled with the fibers in the turbulent suspension within the chamber. The composition which settles to the bottom of the chamber may be used directly as a molding composition or may be subjected to any desired further treatment, as for example, finer grinding, rolling into sheets, and/or granulation, etc.

Instead of acetate, other cellulose esters, nitrate, etc., or Vinyon, nylon, etc., may be used with suitable solvents, and instead of or in addition to viscose any other fibers insoluble in the solvent used, e. g., Bemberg, rayon, cotton, silk, wool, glass, etc.

*Example 2.*—The scrap or other fibrous material in this case, as in Example 1, may be subjected to preliminary cleaning, bleaching, conditioning or other desired treatment, after which it is cut into pieces of about 60 mm. These in turn are subjected to the action of the usual machinery by which they are disintegrated and the fibers released, exactly as in the present practice for reclaiming such fibers for respinning. These fibers are then collected in the form of a roving and the roving is again cut to a very short staple length, e. g., about 5 mm., or in general short enough to avoid lumping and snarling of the fibers during subsequent treatment. The material thus cut is picked up in a blast of air carried through a blower into the turbulent mixing chamber where the fibers are intermingled, and if desired, mixed with additional ingredients as in the case of Example 1.

The intermediate formation of the roving in this case, as compared with Example 1, results in a more uniform fiber length, which gives better physical properties in the molded product and also facilitates the molding operation, especially with the injection molding process. This also affords an opportunity for adding liquid ingredients. In the formation of the roving it is customary to moisten the fibers to facilitate the operation and I have found that this wetting may be effected by a dilute solution of plasticizer or other liquid ingredient desired in the composition being made, or by a liquid fully compatible with the plasticizer or liquid ingredients. If the material added by this moistening is not sufficient the roving can subsequently be passed through a bath of the plasticizer, etc., which saturates the roving and coats the individual fibers.

The roving after it comes from this bath is dried in a continuous manner and passed on to the chopper by which it is cut to the short staple length. I have found that a staple length stated above is most efficient for reinforcing the plastic and allows a large bulk of the non-plastic fiber, and other filler, if desired, to be used, but it will be understood that longer and shorter fiber lengths may be used in my process as desired by a simple adjustment of the chopping machine.

*Example 3.*—Cloth, wadding or rags containing cellulose acetate or other thermo-plastic fiber in excess of 10% may be cleaned and conditioned as in Examples 1 and 2. The material is then dipped or sprayed or otherwise saturated with a 5% solution of tri-acetin. Excess solution is squeezed out from the material, e. g., by passing between rollers, or the material is dried with agitation to avoid local concentration of the solution.

The dried cloth or wadding, etc., thus treated with the plasticizer, is then placed in a mold heated to about 140° C. and subjected to a molding pressure as in the molding of plastic-impregnated fabrics. According to the temperature and pressure used the product may be compacted and consolidated to any desired degree from a stiffened and compressed cloth or wadding, etc., to a dense solid body which no longer shows the weave or web of the original cloth or wadding, etc., or any porosity. The present invention is not concerned with mere stiffened cloth but is attained only when the plasticized surface portions of the fiber are coalesced into a continuous phase by which the intact cores of the fibers are embedded, integrally joined together and cushioned with respect each to the others.

For molding shaped articles, advantageously blanks of size and shape approximating that of the mold will be cut from a suitable thickness of treated cloth or wadding. This material molds readily; but, in view of the woven or felted non-plastic fibers contained therein, it is not readily subjected to uniform lateral flow. It is preferable, therefore, that the blanks should be of approximately the lateral dimensions required for the final article. These may, if desired, be preformed in rough molds and then finish molded in accurately formed molds with or without addition of a finer grade surfacing plastic.

If desired, material treated in accordance with this example may be alternated with layers of cloth or wadding, etc., composed of non-plastic fiber, such as cotton, viscose, etc., and, particularly where the intermediate layers are composed entirely of acetate or of high acetate content, the plastic will impregnate and bind the non-plastic fibers of these alternate layers. Similarly, cloth or wadding, etc., composed entirely of acetate or of high acetate content may be used for the surface layers when cloth or wadding, etc., of relatively low acetate content is used in the intermediate layers.

Colored cloth, wadding, ribbon or thread, etc., e. g., treated in accordance with this example may be used in various plastic compositions to give a marbleized effect. The cloth being given a color contrasting in hue or value with that of the surrounding material, and being more or less crumpled in the mass of molding composition by the molding operation gives an excellent simulation of marble.

The cloth or other textile products treated in accordance with this example may, if desired, be granulated or pulverized and then worked up and mixed with other materials as is customary in preparation of molding compositions.

Although the artificial fibers referred to are most suitable for the plastic ingredient, other fibers ordinarily thought of as non-plastic, e. g., silk, wool, etc., may serve as the plastic binder in the present invention if a suitable plasticizer is added and similarly any material which may be used as a binder in the molding composition if it is capable of drawing out into fibrous form may be used in this invention.

A striking and desirable effect may be attained in a transparent or semi-transparent composition by dyeing the insoluble fiber with a dye which does not migrate into the plastic so that the residual fiber retains a distinctive color showing within the molded mass. This may be accomplished, for example, by use of a cross-dyed fabric, i. e., one made of a mixture of plastic and non-plastic fibers which has been dyed with a dye which is fixed only on the non-plastic fiber and has been washed off from the plastic fiber.

Although in the above I have set forth certain preferred examples and have suggested various modifications thereof, it should be understood that these are not intended to be exhaustive nor limiting of the invention, but on the contrary are intended as examples given in connection with the more general statements with a view to instructing others skilled in the art so that they may utilize the invention with numerous modifications and in numerous embodiments each as may be best adapted to the conditions and requirements of a particular use.

What is claimed is:

1. The method of molding thermo-plastics which comprises extruding and stretching the thermo-plastic to form it into fiber, applying a plasticizer to the exterior of the fiber and compressing a mass of the resulting treated fiber at a temperature sufficient to weld together the plasticized surfaces of said fibers and unite thermoplastic material thereof into a substantially solid body.

2. A process of forming material from textile material comprising thermoplastic textile fibers, in an amount at least 10% of the total fibers which comprises softening only the surfaces of said thermoplastic fibers and uniting the fibers by molding under such pressure that the product no longer retains the fibrous nature of the original textile material, whereby there is obtained a dense integral sheet in which the cores of the fibers remain intact.

3. A process of forming material which comprises applying a plasticizer to textile scrap comprising in excess of 10% of thermoplastic textile fibers so that only the surfaces of said thermoplastic fibers will be softened and uniting the fibers by molding with heat and pressure under such conditions that the product will no longer show the weave or web of the original fabric, whereby there is obtained a dense integral mass in which the cores of the fibers remain intact.

4. A process of forming material from textile fibrous material at least 50% of which is thermoplastic which comprises softening only the surfaces of the fibers leaving the cores of the fibers unsoftened and uniting the fibers under such pressure that surface portions of the fibers are merged into a solid continuous phase, while the cores of the fibers are retained intact.

5. The method of utilizing fibrous scrap containing thermo-plastic textile fiber at least 10% of the total fiber which comprises comminuting said fiber to approximate uniform length of the order of 1 to 15 mm., applying a plasticizer to the surfaces of the fibers and molding under heat and pressure coalescing surface portions of the fibers into a continuous phase by which the cores of the fibers are embedded and integrally joined without redissolving said fibers or disorienting the molecules in the cores thereof.

6. A process of forming material from thermoplastic textile fibers which comprises softening only the surfaces of the fibers leaving the cores of the fibers unsoftened and uniting the fibers under such pressure that the fibers are merged into a solid molded product while retaining the cores of the fibers intact.

7. A strong dense product formed from textile material and comprising in excess of 10% of thermoplastic textile fibers, which no longer shows the original textile fibers but in which the cores of the fibers remain intact.

8. A strong, tough, integral and homogeneous product formed from textile material which comprises the cores of thermo-plastic textile fibers embedded in a solid continuous phase comprising the merged exterior portions of the thermoplastic fibers, said cores and said merged exterior portions constituting at least 10% of the total fiber content of said product.

9. A strong, tough, integral and homogeneous product formed from textile material which comprises the cores of thermoplastic textile fibers embedded in a solid continuous phase comprising the merged exterior portions of the thermoplastic fibers, said cores and said merged exterior portions constituting at least 50% of the total fiber content of said product.

ORLAN M. ARNOLD.

REFERENCES CITED

The following references are of record in the file of this patent:

UNITED STATES PATENTS

| Number | Name | Date |
|---|---|---|
| 1,790,240 | Lionne | Jan. 27, 1931 |
| 2,277,049 | Reed | Mar. 24, 1942 |
| 1,399,590 | Truslow | Dec. 6, 1921 |
| 2,014,947 | McCulloch et al. | Sept. 17, 1935 |
| 1,427,690 | Leysieffer | Aug. 29, 1922 |
| 2,316,283 | Piperous et al. | Apr. 13, 1943 |
| 1,510,779 | Herrmann | Oct. 7, 1924 |
| 1,000,781 | Collier | Aug. 15, 1911 |
| 1,517,221 | Mead | Nov. 25, 1924 |

FOREIGN PATENTS

| Number | Country | Date |
|---|---|---|
| 501,436 | Great Britain | May 3, 1938 |
| 336,264 | Great Britain | Oct. 10, 1930 |